(12) United States Patent
Cupo et al.

(10) Patent No.: US 7,505,396 B2
(45) Date of Patent: Mar. 17, 2009

(54) METHOD AND APPARATUS FOR ESTABLISHING INTERLEAVER SYNCHRONIZATION IN AN ORTHOGONAL FREQUENCY DIVISION MULTIPLEXING (OFDM) COMMUNICATION SYSTEM

(75) Inventors: Robert Louis Cupo, Eatontown, NJ (US); Muhammad R. Karim, Wayside, NJ (US); Mojtaba Shariat, Colts Neck, NJ (US); Mohammad Hossein Zarrabizadeh, Woodbridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 928 days.

(21) Appl. No.: 10/661,300

(22) Filed: Sep. 12, 2003

(65) Prior Publication Data

US 2004/0052206 A1 Mar. 18, 2004

Related U.S. Application Data

(62) Division of application No. 09/398,501, filed on Sep. 17, 1999, now Pat. No. 6,661,771.

(51) Int. Cl.
*H04J 11/00* (2006.01)
*H04B 1/38* (2006.01)
*H04L 5/16* (2006.01)

(52) U.S. Cl. ...................... 370/206; 375/222
(58) Field of Classification Search ......... 370/206–209, 370/350, 335, 343, 516, 204, 527, 210, 463, 370/458; 375/321, 354, 142, 150, 309, 365, 375/355, 359, 362, 366, 281, 222, 316, 260, 375/132, 368; 455/502–504, 506, 515, 574, 455/403, 67, 423, 425, 558

See application file for complete search history.

(56) References Cited

U.S. PATENT DOCUMENTS 5,596,582 A * 1/1997 Sato et al. ............... 370/509

| | | | | |
|---|---|---|---|---|
| 5,889,759 A * | 3/1999 | McGibney | ................. | 370/207 |
| 6,356,598 B1 * | 3/2002 | Wang | ........................ | 375/321 |
| 6,519,280 B1 * | 2/2003 | Cole | ......................... | 375/222 |
| 6,556,639 B1 * | 4/2003 | Goldston et al. | ............ | 375/365 |
| 6,594,320 B1 * | 7/2003 | Sayeed | ....................... | 375/281 |
| 6,661,771 B1 * | 12/2003 | Cupo et al. | ................. | 370/204 |
| 6,693,958 B1 * | 2/2004 | Wang et al. | ................. | 375/232 |
| 6,987,752 B1 * | 1/2006 | Sarraf et al. | ................. | 370/343 |

* cited by examiner

*Primary Examiner*—Wing F Chan
*Assistant Examiner*—Prenell P Jones

(57) ABSTRACT

Interleaving methods and apparatus are disclosed for an in-band on-channel digital audio broadcasting system. The guard periods that separate any two adjacent symbols in a conventional OFDM system can provide a mechanism for OFDM frame synchronization. The guard period of successive OFDM frames is utilized to establish one or more unique positive or negative patterns and thereby provide a mechanism for interleaver synchronization. By proper positioning of the guard period patterns, one or more particular portions of each interleaver block are identified, such as the beginning and midpoint of each interleaver block. The present invention identifies the beginning of each interleaver block, for example, by positioning the fourth negative cyclic prefix with OFDM frame zero (0). The present invention can optionally identify the midpoint of each interleaver block, for example, by positioning the fourth negative cyclic prefix with OFDM frame 206. The beginning of an interleaver block can be distinguished from the midpoint using a unique cyclic prefix pattern. A receiver monitors the incoming data stream for a synchronization pattern to (i) establish interleaver synchronization, (ii) detect when synchronization is lost, and (iii) detect and correct a false synchronization.

6 Claims, 4 Drawing Sheets

METHOD AND APPARATUS FOR ESTABLISHING INTERLEAVER SYNCHRONIZATION IN AN ORTHOGONAL FREQUENCY DIVISION MULTIPLEXING (OFDM) COMMUNICATION SYSTEM

CROSS REFERENCE TO RELATED APPLICATIONS

This application is a divisional application of application Ser. No. 09/398,501, filed Sep. 17, 1999 now U.S. Pat. No. 6,661,771.

FIELD OF THE INVENTION

The present invention relates generally to digital audio broadcasting (DAB) and other types of digital communication systems, and more particularly, to interleaver synchronization techniques for such digital audio broadcasting and other types of digital communication systems.

BACKGROUND OF THE INVENTION

Proposed systems for providing digital audio broadcasting in the FM radio band are expected to provide near CD-quality audio, data services and more robust coverage than existing analog FM transmissions. However, until such time as a transition to all-digital DAB can be achieved, many broadcasters require an intermediate solution in which the analog and digital signals can be transmitted simultaneously within the same licensed band. Such systems are typically referred to as hybrid in-band on-channel (HIBOC) DAB systems, and are being developed for both the FM and AM radio bands.

In order to prevent significant distortion in conventional analog FM receivers, the digital signal in a typical FM HIBOC DAB system is, for example, transmitted in two side bands, one on either side of the analog FM host signal, using orthogonal frequency division multiplexing sub-carriers. In an OFDM communication system, the digital signal is modulated to a plurality of small sub-carrier frequencies that are then transmitted in parallel.

In the United States, the frequency plan established by current FCC regulations separates each transmitting station in a geographical area by 800 KHz. Any transmitting stations in adjacent geographical areas, however, are separated from a local transmitting station by only 200 KHz. Thus, a particularly significant source of interference in such a system is known as first KHz. Thus, a particularly significant source of interference in such a system is known as first adjacent analog FM interference. This interference results when a portion of a FM host carrier in an adjacent geographic area overlaps in frequency with a portion of a digital signal side band. Although first adjacent analog FM interference, when present, typically affects only one of the two digital side bands, it nonetheless represents a limiting factor on the performance of DAB systems. The presence of a strong first adjacent interference signal will significantly degrade the performance of the digital signal transmissions, even when one of the two side bands is free from interference.

Symbol interleavers are employed in many communication systems. Interleaving scrambles a signal over a certain time interval, by reordering the data bits. Typically, block interleavers are employed, where a signal is scrambled by writing the symbols into rows and reading them out in columns, in a known manner. If block-coded symbols are interleaved over the duration of many blocks before transmission, symbols associated with a lost packet will be de-interleaved by the receiver and found among many different coded blocks. Thus, the number of symbol errors that may occur in each coded block is reduced, and the likelihood that a selected block code will correct all symbol errors in a transmitted signal is correspondingly increased.

In OFDM-based communication systems, and especially in the IBOC case, the de-interleaver at the receiver has to be synchronized to the interleaver. Typically, interleaver synchronization is performed by inserting a unique bit pattern into the data stream, thereby requiring additional channel bandwidth. Such interleaver synchronization mechanisms, however, result in delay, overhead information and additional processing. A need therefore exists for an interleaving method and apparatus for an OFDM-based communication system that eliminates additional overhead information and reduces the complexity and processing for symbol interleaving.

SUMMARY OF THE INVENTION

Generally, interleaving methods and apparatus are disclosed for an in-band on-channel (IBOC) digital audio broadcasting system. To overcome the effects of intersymbol interference, any two adjacent symbols in a conventional orthogonal frequency division multiplexing system are separated by a guard period. It is known to use the guard period to provide a mechanism for OFDM frame synchronization.

According to one aspect of the invention, the guard period of successive OFDM frames is utilized to establish one or more unique positive or negative patterns and thereby provide a novel method for interleaver synchronization. In this manner, by proper positioning of the guard period patterns, the present invention can identify one or more particular portions of each interleaver block, such as the beginning and midpoint of each interleaver block.

In one illustrative implementation, OFDM frame synchronization is achieved by retransmitting the last 16 samples of each symbol, during the guard prefix, referred to as the cyclic prefix. Thereafter, the 512 samples of user data are transmitted during the useful symbol period. Finally, the first 16 samples of each symbol, are retransmitted during the guard suffix, referred to as the cyclic suffix. If the phase of the cyclic prefix and cyclic suffix, a1 and b1, is the same, it is referred to as a positive prefix. If the phase is opposite, it is referred to as a negative prefix.

The present invention can identify the beginning of each interleaver block, for example, by positioning the fourth negative cyclic prefix with OFDM frame zero (0). In addition, the present invention can optionally identify the midpoint of each interleaver block by positioning the fourth negative cyclic prefix with OFDM frame 206 (assuming 414 frames, numbered 0 through 413). The beginning of an interleaver block can be distinguished from the midpoint using a unique cyclic prefix pattern. For example, the beginning of each interleaver block can be identified by a unique cyclic prefix pattern comprised of "−+−++−+++−," while the midpoint of each interleaver block can be identified by a unique cyclic prefix pattern comprised of "−+++−++++−+++++−."

According to another aspect of the invention, a receiver can detect when synchronization is lost, and detect and correct a false synchronization. Once a predefined synchronization condition is satisfied (i.e., a unique positive or negative pattern is established using the guard periods), a synchronization (SYNCH) state is entered. While in the synchronization state, each received frame is monitored for the synchronizing pattern to ensure that the receiver remains in the SYNCH state. If synchronization remains correct, the next synchronization pattern should appear at the periodic OFDM frame interval (every 414 frames). If the pattern is not detected at the expected point, synchronization is at least temporarily lost. After a temporary loss of synchronization, if the synchronization pattern is detected at the expected position, the temporary loss of synchronization condition is ignored, and the receiver returns to the synchronization (SYNCH) state. If the synchronization pattern is not detected at the expected position for a predefined number of blocks, synchronization is lost and the receiver must monitor each received frame for the synchronizing pattern. If a synchronization pattern is detected at an unexpected position a predefined number of times, while in the synchronization state, synchronization is lost and the receiver must search for the synchronizing pattern all over again.

A more complete understanding of the present invention, as well as further features and advantages of the present invention, will be obtained by reference to the following detailed description and drawings.

DETAILED DESCRIPTION

Figure 1:
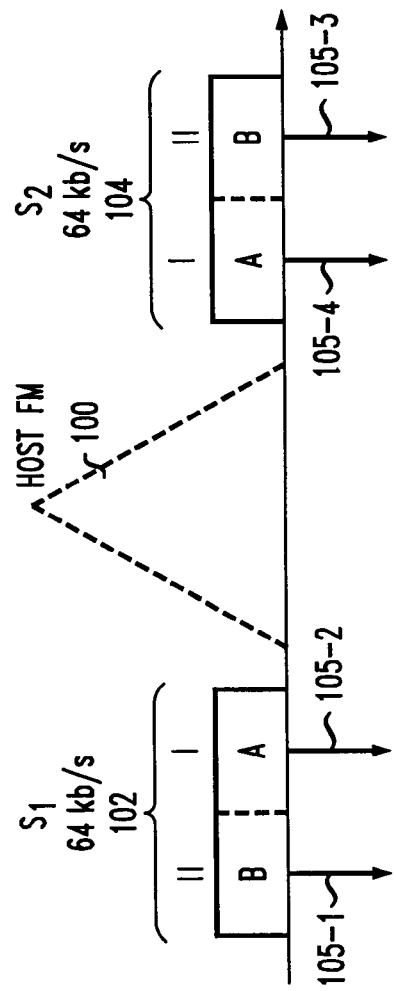
FIG. 1 shows a portion of a frequency spectrum in an exemplary hybrid in-band on-channel digital audio broadcasting system in accordance with the present invention.

FIG. 1 illustrates a portion of a frequency spectrum in an exemplary FM HIBOC DAB system, plotted with the power, P, as a function of frequency,$f$. The portion of the spectrum shown in FIG. 1 includes an analog host FM signal 100 with associated lower digital side band 102 and upper digital side band 104. The side bands represent portions of the frequency spectrum used to transmit digital audio information in the HIBOC DAB system.

To overcome the effects of intersymbol interference, any two adjacent symbols in a conventional orthogonal frequency division multiplexing system are separated by a guard period. As discussed further below in conjunction with FIG. 3, the guard period can be utilized to provide for OFDM frame synchronization. In addition, according to one feature of the present invention, discussed further below in conjunction with FIGS. 4 and 5, the guard period of successive OFDM frames is utilized to establish one or more unique positive or negative patterns and thereby provide a novel method for interleaver synchronization. In this manner, the present invention can identify one or more particular portions of each interleaver block, such as the beginning and midpoint of each interleaver block. In order to avoid loss of user information, the system should syncrhonize as soon as possible, such as within one or two interleaver blocks. In addition, the probability of false synchronization must be low, such as below $10^{-6}$.

According to a further feature of the present invention, discussed further below in conjunction with FIG. 7, a receiver can detect when synchronization is lost, and detect and correct a false synchronization. Initially, a receiver will monitor the incoming data stream to determine if a synchronization condition is satisfied. Once the synchronization condition is satisfied, a synchronization state is entered. While in the synchronization state, each received frame is monitored for the synchronizing pattern to ensure that the receiver remains in the SYNCH state. If synchronization remains correct, the next synchronization pattern should appear at the periodic OFDM frame interval (every 414 frames). If the pattern is not detected at the expected point, synchronization is at least temporarily lost. After a temporary loss of synchronization, if the synchronization pattern is detected at the expected position, the temporary loss of synchronization condition is ignored, and the receiver returns to the synchronization state. If a synchronization pattern is detected at an unexpected position a predefined number of times, while in the synchronization state, the receiver returns to the out-of-synchronization (OOS) state and searches for the synchronizing pattern all over again.

The system in the illustrative embodiment, discussed further below, uses an inner cyclic redundancy code (CRC), and differential quadrature phase shift keyed (DQPSK)/OFDM modulation. The DQPSK modulation of transmitted symbols provides robustness to frequency-selective fading and oscillator phase drift. The differential encoding is performed in the frequency domain using OFDM sub-carriers. The digital signal to be transmitted and the inner CRC block code are repeated in each of the side bands 102, 104. As shown in FIG. 1, each of the side bands include N components, 102-1 through 102-N, and 104-1 through 104-N, respectively. The components may represent, for example, sets of orthogonal frequency division multiplexed sub-carriers.

Figure 2:
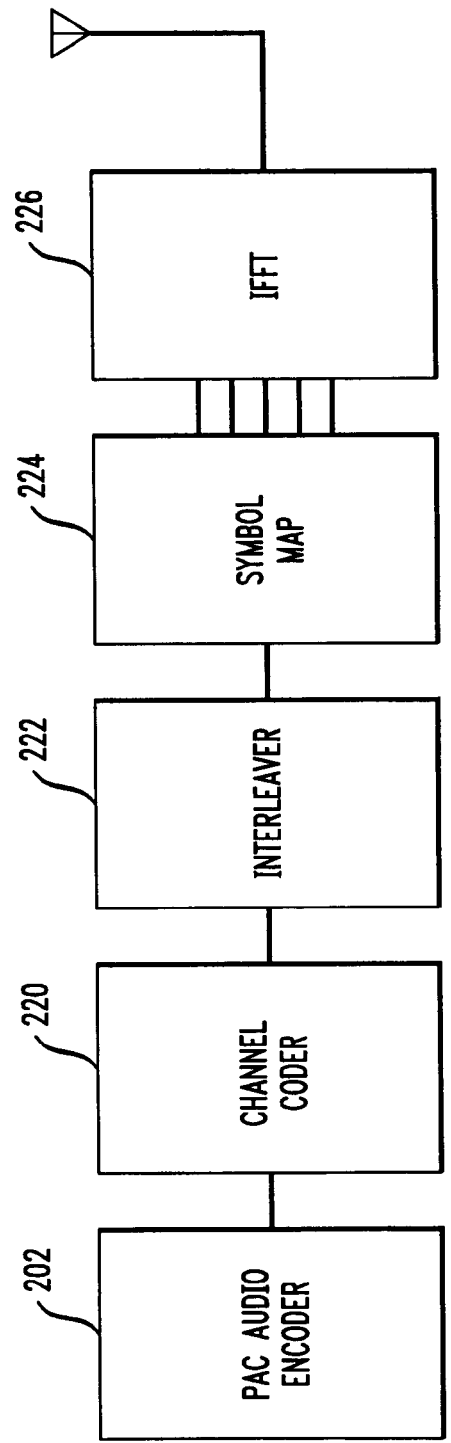
FIG. 2 is a schematic block diagram of a transmitter in an exemplary hybrid in-band on-channel digital audio broadcasting system in which the present invention may be implemented.

FIG. 2 shows a transmitter 200 of an exemplary FM HIBOC DAB system in which the invention may be implemented. It should be noted that FIG. 2 shows only the digital portion of the system, i.e., the portions associated with generation and processing of the digital signals. Additional conventional processing elements may be used to process the analog signals. A PAC audio coder 202 generates an encoded audio signal at a bit rate, for example, of 96 kbps using the audio compression techniques described, for example, in D. Sinha, J. D. Johnston, S. Dorward and S. R. Quackenbush, "The Perceptual Audio Coder," in Digital Audio, Section 42, pp. 42-1 to 42-18, CRC Press, 1998, incorporated by reference herein. The encoded audio bit stream is applied to a channel coder 220 that implements an error-correcting convolutional code.

As shown in FIG. 2, the FM HIBOC DAB system 200 also includes an interleaver 222 that reorders the data bits. The reordered data bits are then mapped into symbols using a symbol mapping block 224, which then modulate a number of carriers of an orthogonal frequency division multiplexing system. For a more detailed discussion of an orthogonal frequency division multiplexing system, see, for example, W. Y. Zou and Y. Wu, "COFDM—An Overview," IEEE Trans. Broadcasting, Vol. 41, No. 1, 1-8 (March 1995) or J. A. C. Bingham, "Multicarrier Modulation for Data Transmission: An Idea Whose Time Has Come," IEEE Comm., 5-14 (May 1990), each incorporated by reference herein. Generally, the orthogonal frequency division multiplexing system includes the symbol map block 224 and the IFFT block 226. The components shown in FIG. 2 would normally be followed by conventional IF and RF sections of a radio transmitter (not shown). The modulated output of the orthogonal frequency division multiplexing system, which corresponds to the digital side bands 102 and 104, is transmitted through an FM broadcast channel 230 to a receiver (not shown). In one implementation, the symbol map block 224 processes the interleaved bit stream to generate a two-bit QPSK symbol, which then modulates the appropriate sub-carrier in the OFDM modulators.

As previously indicated, conventional orthogonal frequency division multiplexing systems separate any two adjacent symbols by a guard period to overcome the effects of intersymbol interference. Thus, the guard period can provide for OFDM frame synchronization. A symbol generated by the IFFT block 226 consists of 512 samples of user data. In addition, a guard period of 32 samples is inserted between each adjacent symbol. Thus, as shown in FIG. 3, an OFDM frame consists of 544 samples, with a 16 sample guard prefix, 512 samples of user data and a 16 sample guard suffix.

Figure 3:
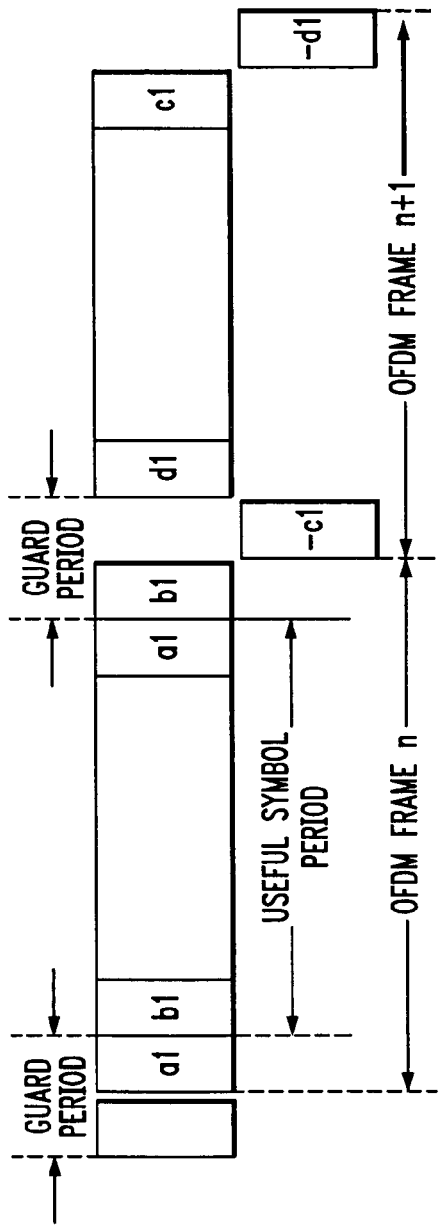
FIG. 3 illustrates a guard period and cyclic prefix for OFDM frame synchronization in accordance with the present invention.

In one implementation, OFDM frame synchronization is achieved by retransmitting the last 16 samples of each symbol, referred to in FIG. 3 as a1, during the guard prefix, referred to as the cyclic prefix. Thereafter, the 512 samples of user data are transmitted during the useful symbol period. Finally, the first 16 samples of each symbol, referred to in FIG. 3 as b1, are retransmitted during the guard suffix, referred to as the cyclic suffix. It is noted that the cyclic prefix and cyclic suffix, a1 and b1, have the same amplitude as the corresponding sample data in the useful symbol period, but the cyclic prefix and cyclic suffix, a1 and b1, can have the same or opposite phase as the corresponding sample data in the useful symbol period. If the phase is the same, such as the phase of the OFDM frame n shown in FIG. 3, it is referred to as a positive prefix. If the phase is opposite, such as the phase of OFDM frame n+1 shown in FIG. 3, it is referred to as a negative prefix.

Figure 4:
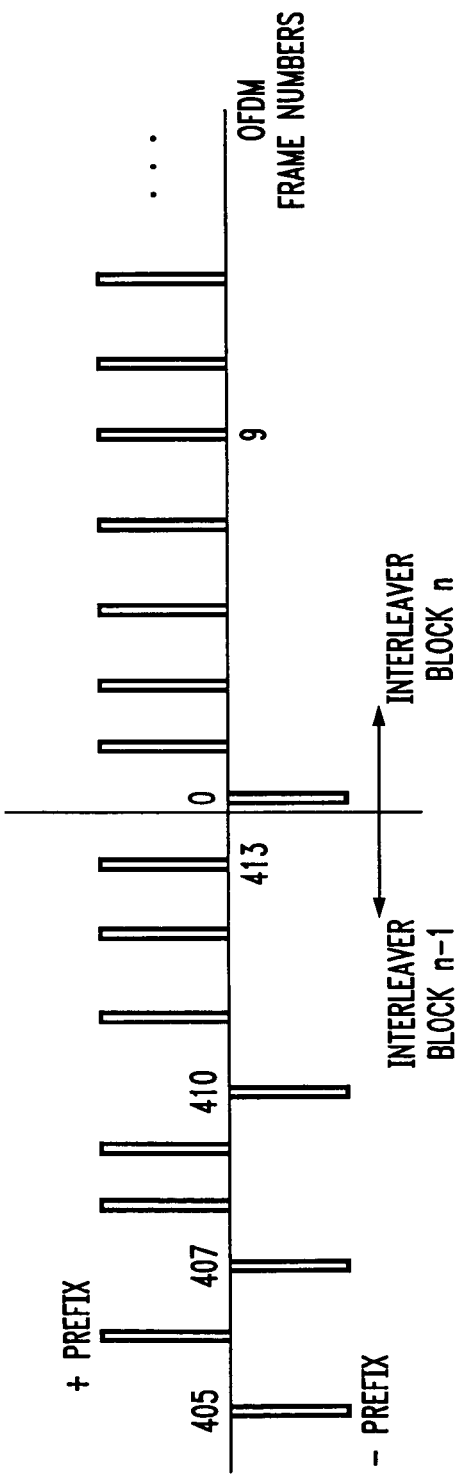
FIG. 4 illustrates the synchronizing prefix sequence to identify the start of an interleaver block in accordance with the present invention.
Figure 5:
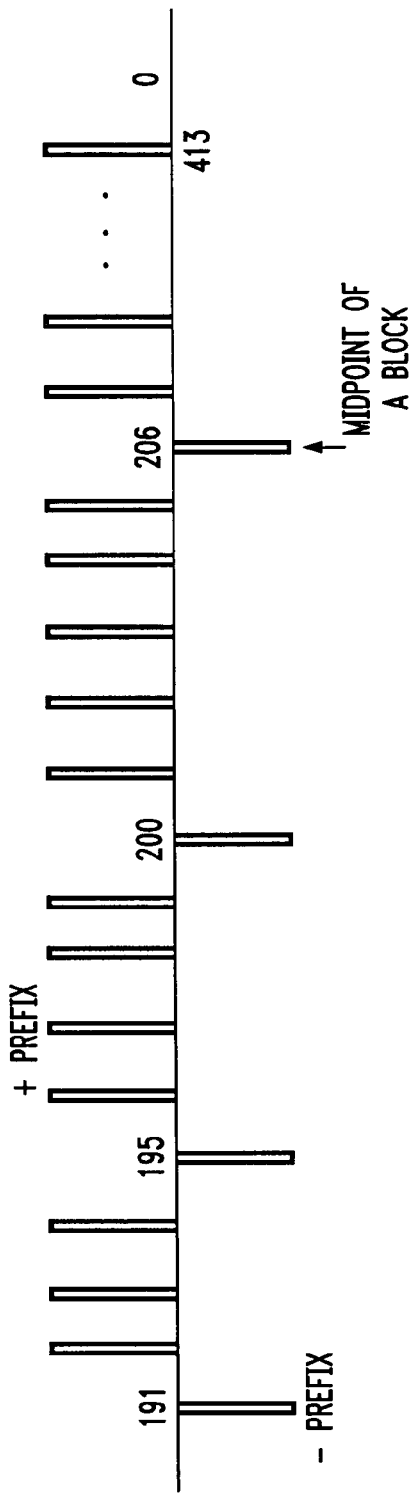
FIG. 5 illustrates the synchronizing prefix sequence to identify the midpoint of an interleaver block in accordance with the present invention.

In addition, as shown in FIGS. 4 and 5, the present invention utilizes the guard period of successive OFDM frames to establish one or more unique positive or negative patterns, and thereby provide a mechanism for interleaver synchronization. In this manner, the present invention can identify one or more particular portions of each interleaver block, such as the beginning and midpoint of each interleaver block. FIG. 4 illustrates the synchronizing prefix sequence to identify the start of an interleaver block in accordance with the present invention. FIG. 5 illustrates the synchronizing prefix sequence to identify the midpoint of an interleaver block in accordance with the present invention.

In the illustrative embodiment, an interleaver block consists of 414 OFDM frames, numbered zero through 413. In one implementation, shown in FIG. 4, the beginning of each interleaver block is identified by positioning the fourth negative cyclic prefix with OFDM frame zero (0). In addition, as shown in FIG. 5, the midpoint of each interleaver block can optionally be identified by positioning the fourth negative cyclic prefix with OFDM frame 206. In addition, to differentiate the beginning of an interleaver block from the midpoint, a unique cyclic prefix pattern is used to separately identify the beginning and midpoints of each interleaver block. For example, as shown in FIG. 4, the beginning of each interleaver block is identified by a unique cyclic prefix pattern comprised of "−+−++−+++−." Likewise, as shown in FIG. 5, the midpoint of each interleaver block is identified by a unique cyclic prefix pattern comprised of "−+++−++++−+++++−."

Receiver Implementation

Figure 6:
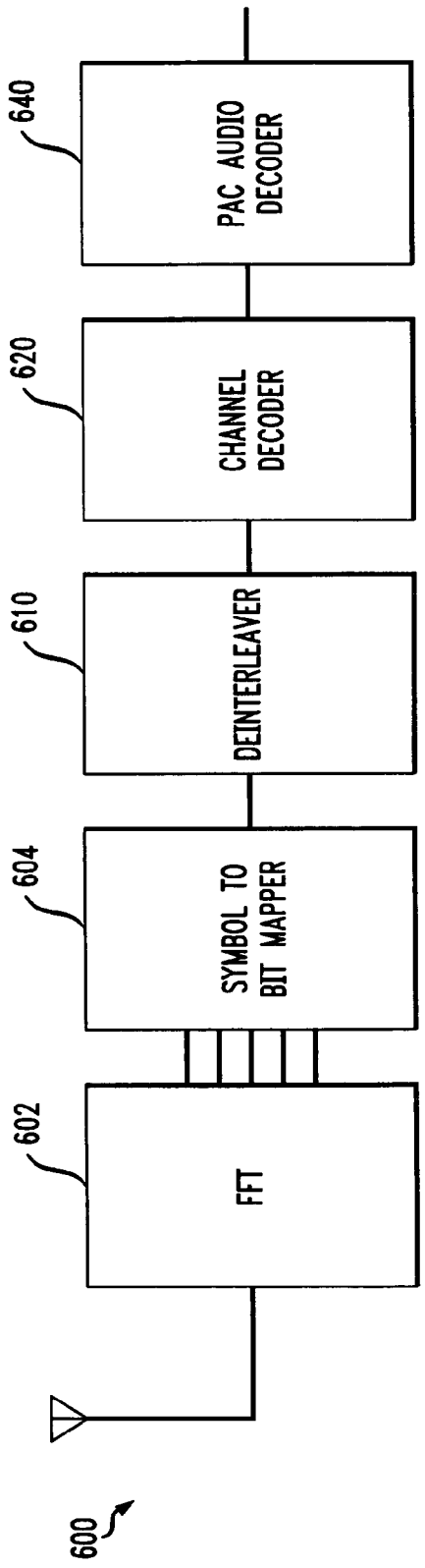
FIG. 6 is a schematic block diagram of an exemplary receiver in a hybrid in-band on-channel digital audio broadcasting system in which the present invention may be implemented.

FIG. 6 is a schematic block diagram of a receiver 600 in a DQPSK-OFDM system, in accordance with the present invention. The receiver 600 processes the outputs ±I to ±I±$N_a$, of the FFT block 602, where the outputs ±I to ±I±$N_a$ correspond to the upper and lower active bins in absence of any frequency offset. As shown in FIG. 6, the receiver 600 also includes a symbol to bit mapper 604, a deinterleaver 610, a channel decoder 620 and a PAC audio decoder 640. For a discussion of these elements, see, for example, W. Y. Zou and Y. Wu, "COFDM—An Overview," IEEE Trans. Broadcasting, Vol. 41, No. 1, 1-8 (March 1995) or J. A. C. Bingham, "Multicarrier Modulation for Data Transmission: An Idea Whose Time Has Come," IEEE Comm., 5-14 (May 1990), each incorporated by reference herein.

According to a further feature of the present invention, the interleaver synchronization is performed after the OFDM frame synchronization has been achieved. Assuming that an OFDM frame begins with sample 0, the interleaver synchronization is performed as follows.

As each OFDM frame is received, the receiver 600 searches for the OFDM frame synchronization pattern. In other words, the receiver 600 compares the complex correlation coefficients of samples zero (0) through 15 with samples 512 through 527 (a1) and samples 528 through 543 with samples 16 through 31 (b1). The complex correlation coefficients are computed and saved in a first-in-last-out stack. In other words, the correlation coefficients are saved in the stack for one interleaver block, i.e., the latest 414 OFDM frames.

The resulting data sequence in the stack is referred to as $\{a_i\}$, where i varies from 0 through 413. Four indices, k<l<m<n, are determined, such that for each index, the real part of $a_i$, is negative and its absolute value is one of the four largest. Thus, the four indices, k<l<m<n, indicate the OFDM frame numbers at which the correlation coefficients have local minima. The current frame is then taken to be the start of an interleaver block if the following illustrative synchronization condition holds:

k=0, l=4, and m=7; or
k=0, l=4, and n=9; or
k=0, m=7 and n=9; or
l=4, m=7 and n=9.

In other words, the present invention establishes interleaver frame synchronization if three of the four negative cyclic prefixes are detected in the correct frame location. Likewise, in an implementation where the midpoint of each interleaver block is identified, the current frame is then taken to be the midpoint of an interleaver block if the following illustrative synchronization condition holds:

k=0, l=6, and m=11; or
k=0, l=6, and n=15; or
k=0, m=11 and n=15; or
l=6, m=11 and n=15.

After synchronization is achieved, each incoming OFDM frame is monitored to detect the two synchronizing sequences. Synchronization is considered to be lost when the synchronizing sequences have not been detected at their expected positions in ten (10) consecutive blocks. In the illustrative implementation, where a block is approximately 534 milliseconds long, synchronization is lost if the synchronization patterns are not detected for a period of 5.34 seconds.

Once the receiver 600 is synchronized, the receiver 600 must ensure that it is not falsely synchronized as follows. If the synchronization is correct, the synchronization pattern should appear in succeeding blocks at precisely the same position with a high probability (on the order of 0.8). If synchronization is lost, the synchronization pattern will appear in succeeding blocks at a different position. Thus, false synchronization is corrected by returning to the search mode and attempting to resynchronize. The receiver 600 can be said to be resynchronized, for example, if the synchronization pattern is detected at unexpected but identical OFDM frame positions in two consecutive blocks.

Figure 7:
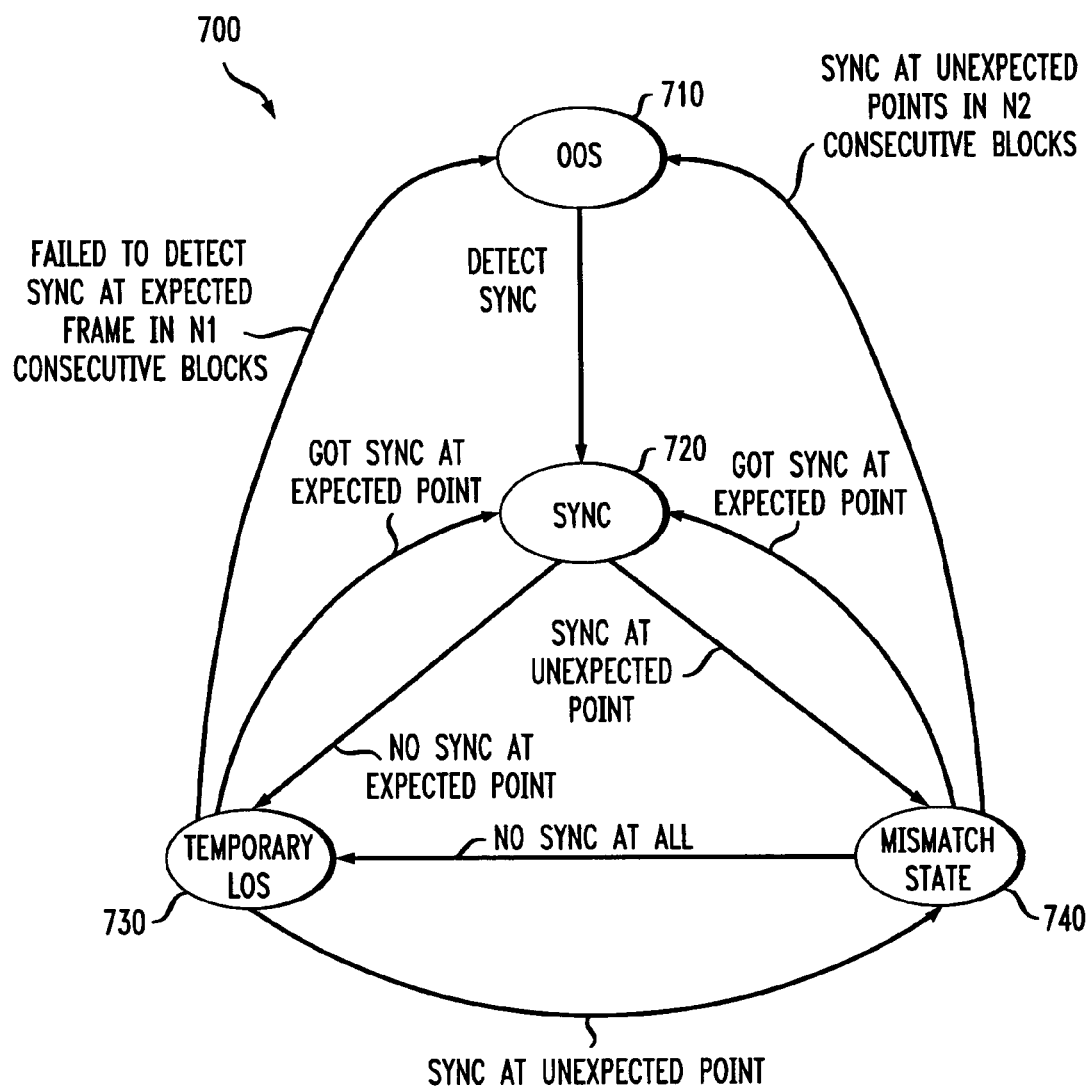
FIG. 7 illustrates a state diagram for the interleaver synchronization process of the present invention.

FIG. 7 illustrates a state diagram 700 for the interleaver synchronization process of the present invention. Initially, when the receiver 600 is first tuned to a channel, the synchronizer is an out-of-synchronization state 710. As each OFDM frame is received, a test is performed to see if the synchronization condition specified above is satisfied. If the synchronization condition is satisfied, the synchronization state 720 is entered. The position of the synchronizing pattern just detected is referred to as $p_0$. In the synchronization state 720, each received frame is monitored for the synchronizing pattern. If synchronization remains correct, the next synchronization pattern should appear exactly after 414 OFDM frames. Thus, if the pattern is not detected at the expected point, the state machine enters a temporary loss of synchronization (LOS) state 730. If the temporary loss of synchronization state 730 continues for N1 consecutive blocks, loss of synchronization is declared and the out-of-synchronization state 710 is again entered, where the receiver 600 monitors each received frame for the synchronizing pattern.

While in the temporary loss of synchronization state 730, if the synchronization pattern is detected at the expected position, the temporary loss of synchronization condition is ignored, and the receiver 600 returns to the synchronization state 720.

If, however, a synchronization pattern is detected at an unexpected position, $p_1$, (where $p_1 \neq p_0$) while in the synchronization state 720, the receiver 600 enters a mismatch state 740. While in the mismatch state 740, if a synchronization pattern is again detected at position $p_1$ in the next block, indicating either an incorrect synchronization in the first place, or a change in the transmitted signal, the receiver 600 returns to the out-of-synchronization state 710 and searches for the synchronizing pattern all over again.

It is to be understood that the embodiments and variations shown and described herein are merely illustrative of the principles of this invention and that various modifications may be implemented by those skilled in the art without departing from the scope and spirit of the invention.

We claim:

1. A method for synchronizing interleavers in an OFDM communication system, wherein a guard period separates any two adjacent symbols, said method comprising the steps of:
    monitoring a guard period of each received OFDM frame for a predefined interleaver synchronizing pattern;
    entering a synchronization state upon detecting said predefined interleaver synchronizing pattern;
    monitoring said guard period of each received OFDM frame for said predefined interleaver synchronizing pattern at periodic frame intervals; and
    returning to said monitoring step if said predefined interleaver synchronizing pattern is not detected at said periodic frame interval for a predefined number of blocks.

2. The method of claim 1, wherein a predefined synchronization condition is the detection of a predefined cyclic prefix pattern.

3. A method for synchronizing interleavers in an OFDM communication system, wherein a guard period separates any two adjacent symbols, said method comprising the steps of:
    monitoring a guard period of each received OFDM frame for a predefined interleaver synchronizing pattern;
    entering a synchronization state upon detecting said predefined interleaver synchronizing pattern;
    monitoring said guard period of each received OFDM frame for said predefined interleaver synchronizing pattern at periodic frame intervals; and
    returning to said monitoring step if said predefined interleaver synchronizing pattern is detected at an unexpected location for a predefined number of blocks.

4. The method of claim 3, wherein a predefined synchronization condition is the detection of a predefined cyclic prefix pattern.

5. An apparatus for synchronizing interleavers in an OFDM communication system, wherein a guard period separates any two adjacent symbols, said apparatus comprising:
    means for monitoring a guard period of each received OFDM frame for a predefined interleaver synchronizing pattern;
    means for entering a synchronization state upon detecting said predefined interleaver synchronizing pattern;
    means for monitoring said guard period of each received OFDM frame for said predefined interleaver synchronizing pattern at periodic frame intervals; and
    means for returning to said monitoring step if said predefined interleaver synchronizing pattern is not detected at said periodic frame interval for a predefined number of blocks.

6. An apparatus for synchronizing interleavers in an OFDM communication system, wherein a guard period separates any two adjacent symbols, said apparatus comprising:
    means for monitoring a guard period of each received OFDM frame for a predefined interleaver synchronizing pattern;
    means for entering a synchronization state upon detecting said predefined interleaver synchronizing pattern;
    means for monitoring said guard period of each received OFDM frame for said predefined interleaver synchronizing pattern at periodic frame intervals; and
    means for returning to said monitoring step if said predefined interleaver synchronizing pattern is detected at an unexpected location for a predefined number of blocks.

* * * * *